(12) United States Patent
Simhon et al.

(10) Patent No.: US 11,853,453 B1
(45) Date of Patent: Dec. 26, 2023

(54) AUTOMATIC IDENTIFICATION OF CLEAR TEXT SECRETS

(71) Applicant: Intuit Inc., Mountain View, CA (US)

(72) Inventors: Ariel Simhon, Hod Hasharon (IL); Liron Hayman, Hod Hasharon (IL); Gabriel Goldman, Hod Hasharon (IL); Yaron Moshe, Hod Hasharon (IL)

(73) Assignee: INTUIT INC., Mountain View, CA (US)

( * ) Notice: Subject to any disclaimer, the term of this patent is extended or adjusted under 35 U.S.C. 154(b) by 1181 days.

(21) Appl. No.: 16/365,891

(22) Filed: Mar. 27, 2019

(51) Int. Cl.
*G06F 21/62* (2013.01)
*G06F 16/245* (2019.01)
*G06F 16/28* (2019.01)

(52) U.S. Cl.
CPC ........ *G06F 21/6245* (2013.01); *G06F 16/245* (2019.01); *G06F 16/285* (2019.01)

(58) Field of Classification Search
CPC .............. G06F 21/6245; G06F 16/245; G06F 16/2455; G06F 16/285
See application file for complete search history.

(56) References Cited

U.S. PATENT DOCUMENTS

| | | | |
|---|---|---|---|
| 9,998,484 B1 * | 6/2018 | Buyukkayhan | G06F 21/567 |
| 2019/0332658 A1 * | 10/2019 | Heckel | G06F 40/166 |
| 2020/0067861 A1 * | 2/2020 | Leddy | G06Q 30/0185 |

* cited by examiner

*Primary Examiner* — Ashokkumar B Patel
*Assistant Examiner* — William B Jones
(74) *Attorney, Agent, or Firm* — DLA PIPER LLP (US)

(57) ABSTRACT

A processor may receive clear text data. The processor may represent at least a portion of the clear text data as at least one array encoding a description of at least one feature of the clear text data. The processor may process the at least one array using a clustering algorithm to determine whether the at least one array is grouped with a benign cluster or a sensitive cluster of a model. In response to determining that the at least one array is grouped with the sensitive cluster, the processor may generate an alert indicating that the clear text data includes sensitive information.

14 Claims, 7 Drawing Sheets

| 200 – Boolean array (word representation) | | | | | | |
|---|---|---|---|---|---|---|
| Digit in middle | Capital letter in middle | Non-ascii key present | Special characters | camelCase | String length < n letters | etc. |
| 1 | 0 | 1 | 0 | 1 | 1 | ... |
| | | | | 1 | 0 | ... 0 |

FIG. 2

AUTOMATIC IDENTIFICATION OF CLEAR TEXT SECRETS

BACKGROUND OF THE DISCLOSURE

Computer users and/or automated processes may store passwords and/or other sensitive content as clear text, and may then upload or otherwise store this clear text in places accessible by others. This may place the sensitive content at risk of being discovered. Individuals or organizations can screen for sensitive content in clear text by manually examining documents or by some available computerized processes. For example, current solutions involve performing hard-coded searches to identify passwords in documents. This is not scalable across different document types, and does not extend beyond domains. For example, in Python, a user might save "password='xyz'," but in a .config file the same data may be saved as "password: 'xyz'." Additionally, the variable might be saved as pwd, passwd, pass_word, etc. Each format, variable, language, etc. has to be manually encoded and used as a search term. It is a very lengthy process to do this manually, and it is practically impossible to encode more than a few possible examples of sensitive data.

BRIEF DESCRIPTION OF THE FIGURES

FIG. 2 shows a Boolean array according to an embodiment of the disclosure.

DETAILED DESCRIPTION OF SEVERAL EMBODIMENTS

Some embodiments described herein may provide an automated machine learning (ML) solution that may leverage natural language processing (NLP) and/or external data sources to automatically detect sensitive content within clear text. Once sensitive content is detected, some embodiments may alert users to enable deletion or obscuring of the sensitive content from the clear text and/or may facilitate automatic deletion or obscuring of the sensitive content from the clear text. Accordingly, some embodiments may extend detection to languages beyond English, may not require analysts hard-coding search strings, and/or may support a detection model that can be trained automatically at scale.

For example, some embodiments may extract assigned variables from a document, then may convert each extracted variable into a Boolean encoded array. Assigned variables may be extracted and converted for a plurality of documents in a corpus of benign documents. Embodiments may perform the same process in parallel for sensitive data by leveraging external databases of leaked passwords and secret keys, etc. The extracted Boolean data may be fed into a clustering algorithm, which may create clusters that represent sensitive text. With trained clusters in place, a new document can be fed in and processed similarly. If the new document has words that are associated with the sensitive text cluster, then an alert may be raised to the appropriate party and/or other corrective action may be taken.

The use of ML may allow some embodiments to be trained to adapt to different kinds of sensitive content (e.g., including a variety of languages and/or terms) and/or different kinds of clear text files. ML embodiments may adapt to any term, phrase, file type, etc., while hard coded regular expression ("regex") searches may need to be reconfigured for different words, word combinations, and/or file types. For example, in Python, a user might save "password='xyz'," but in a .config file the same data may be saved as "password: 'xyz'." Additionally, the variable may be saved as pwd, passwd, password, etc. In some cases, the disclosed embodiments may be used along with other tests that use hard coded regex searches (e.g., where the hard coded regex searches may be used to find common examples of sensitive data, and the disclosed embodiments may be used to find subtle or unique examples of sensitive data). The disclosed embodiments may not be affected by the change in terminology across file types and/or data entry preferences such as language or variable name choices, and may detect sensitive content in clear text for each of these examples and more. In some embodiments, similar techniques may be adopted to identify any type of text or characters in a document, not only sensitive content.

Figure 1:
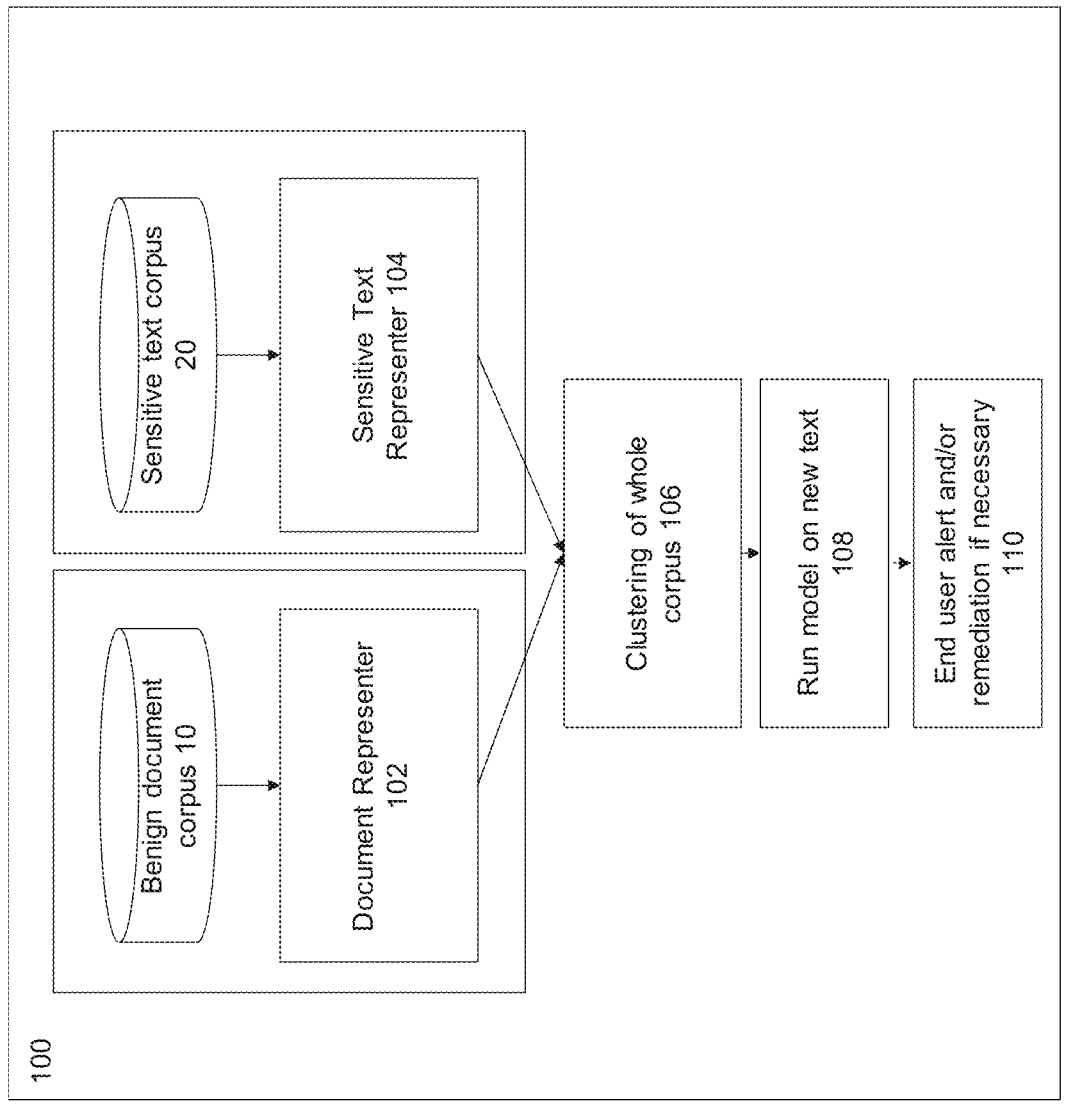
FIG. 1 shows an automatic text identification process according to an embodiment of the disclosure.

FIG. 1 shows an automatic text identification process 100 according to an embodiment of the disclosure. Process 100 may be an overall process performed by one or more computers (e.g., such as those described below with respect to FIG. 7). Process 100 may include both ML training and/or clustering components and clear text analysis components. In some embodiments, ML and/or clustering components may be performed by one or more training computers to prepare trained model data used for detecting sensitive content in clear text. Once ML training and/or clustering is complete, the same computers, or one or more separate analysis computers (e.g., such as those described below with respect to FIG. 7), may apply the trained model to new inputs to detect sensitive content. Also, in some embodiments, ML training and/or clustering may be repeated occasionally or periodically to update the trained model data. Thus, while process 100 as illustrated includes a single example of each training component, clustering component, and analysis component, it should be understood that subsequent processing may perform one or more of these components separately and/or out of sequence. Process 100 may be a fully automated process of using external data sources and/or internal data sources, in addition to ML methods, to identify storage of sensitive data in documents in a way that may be extensible to languages beyond English, that may not require hard-coded string regexs, and may be trained automatically at scale.

ML training may include evaluating data within a benign document corpus 10. Benign document corpus 10 may include one or more documents that are not expected to include any data that is to be identified by automatic text identification process 100. For example, when the data to be identified is sensitive data such as passwords, benign document corpus 10 may comprise one or more documents that do not include sensitive data such as passwords in clear text. In some embodiments, the data in benign document corpus 10 may have been evaluated by users to ensure that no sensitive data is in clear text and/or may come from a trusted source that has verified that no sensitive data is in clear text, for example.

The computer may perform a document representer process 102 to analyze benign document corpus 10. An example of document representer process 102 is described in greater detail below with respect to FIG. 3. In performing document representer process 102, the computer may go through each document in benign document corpus 10 and extract any assigned variables from that document. An assigned variable may be a variable of a type which document representer process 102 is assigned to identify (for example, an assigned variable may be a word, a string of characters, a specific word such as a password detected in clear text, or the like). Assigned variables may vary depending on what type of file is being processed and/or what type of sensitive or other data is being analyzed in some embodiments. The extracted assigned variables may be converted to Boolean arrays which represent the extracted assigned variables as a string of features. The computer may perform this processing for all documents in benign document corpus 10 or any subset thereof.

FIG. 2 shows a Boolean array 200 according to an embodiment of the disclosure. Document representer process 102 may generate a Boolean array 200 for each extracted assigned variable. Boolean array 200 may encode one or more features of the extracted assigned variable in a string of one or more characters, such as binary characters. Boolean array 200 may be of any length necessary to include all features of interest for the extracted assigned variable. For example, the Boolean array 200 of FIG. 2 may be for an extracted word. The features encoded in the example of FIG. 2 include whether the word has a digit in the middle of the word (e.g., not as the first character or the last character of the word), whether the word has a capital letter in the middle of the word (e.g., not as the first character or the last character of the word), whether the word includes a non-ascii character, whether the word includes a special character (e.g., a non-letter and non-numeric character available on a standard keyboard, such as a punctuation mark, bracket, or other character), whether the word is a camel case word (e.g., a word made up of multiple words forming a phrase, where at least one word in the phrase other than the first word starts with a capital letter), and/or whether the length of the word is below a specified number of characters. These features are presented as examples of features for words that may be used as passwords for the purpose of illustration, but it should be understood that Boolean array 200 may include fewer features than illustrated, more features than illustrated, and/or different features from those illustrated.

By representing extracted assigned variables using a Boolean array 200, the computer may represent similar strings in the same way. For example, depending on the features selected for encoding in the Boolean array 200, the strings "300" and "314" may be represented by the same Boolean array 200, and the strings "myVariable" and "hisVariable" may be represented by the same Boolean array 200. This may account for the fact that in many cases, passwords and secret keys may be similar in structure to one another for a wide variety of users, but may not be at all alike in terms of exact characters chosen. At the same time, passwords and secret keys may be very different to human-readable variable names (e.g., ordinary written language words and/or numbers).

The ML training may also include evaluating data within a sensitive text corpus 20. Sensitive text corpus 20 may include one or more documents that are expected to include data that is to be identified by automatic text identification process 100. For example, when the data to be identified is sensitive data such as passwords, sensitive text corpus 20 may comprise one or more documents that include sensitive data such as passwords in clear text. For example, sensitive text corpus 20 may include data taken from external data sources available on the Internet or from other locations that may be known to include sensitive data (e.g., leaked unencrypted password databases).

The computer may perform a sensitive text representer process 104 to analyze sensitive text corpus 20. An example of sensitive text representer process 104 is described in greater detail below with respect to FIG. 4. In performing sensitive text representer process 104, the computer may extract assigned variables and convert them to Boolean arrays 200 using the same features as were used by document representer process 102, for example.

In some embodiments, document representer process 102 and/or sensitive text representer process 104 may be performed multiple times with the same benign document corpus 10 and/or sensitive text corpus 20, but with different Boolean array 200 features. The results may be analyzed (e.g., by human users in some embodiments) to determine whether the Boolean array 200 used by document representer process 102 and/or sensitive text representer process 104 consistently represents passwords and/or other sensitive data by different Boolean array 200 strings from benign data. On this basis, Boolean array 200 features may be selected for inclusion in the final model.

After performing document representer process 102 and sensitive text representer process 104, the computer may have a set of Boolean arrays 200 that may be known to indicate data that is benign (e.g., from benign document corpus 10) and data that is sensitive (e.g., from sensitive text corpus 20). The computer may feed both sets of Boolean array 200 representations into a clustering process 106. An example clustering process 106 is described in greater detail below with respect to FIG. 5. One or more clustering algorithms may be used to generate at least two clusters, where at least one cluster includes benign data, and at least one other cluster includes sensitive data. A Boolean array's 200 inclusion in the benign data cluster may indicate that the Boolean array 200 does not represent a string of sensitive data in clear text. On the other hand, a Boolean array's 200 inclusion in the sensitive data cluster may indicate that the Boolean array 200 represents a string of sensitive data in clear text. In some embodiments, clusters may be manually verified to determine that the clustering did a good job of separating sensitive strings from benign strings.

The clusters may form a model that may be used to identify sensitive data in clear text. For example, the computer may perform a text identifier process 108. An example text identifier process 108 is described in detail with respect to FIG. 6 below. In text identifier process 108, a new document or data set may be input to the computer. For example, when a user uploads a document or other file to a particular repository (e.g., a common repository that may be accessible to multiple users), text identifier process 108 may scan the uploaded data. In another example, when a user attempts to send an email or other message, text identifier process 108 may scan the message and/or any attachments to the message. The computer may extract assigned variables and convert them to Boolean arrays 200 using the same features as were used by document representer process 102 and/or sensitive text representer process 104, for example. Then, the Boolean arrays 200 from the new document may be processed using the clustering algorithm. If one or more Boolean arrays 200 are assigned to a sensitive data cluster, the computer may perform alert and/or remediation processing 110. For example, alert and/or remediation processing 110 may include sending an alert to a user (e.g., by the computer sending a message to a user device through a network and/or displaying an alert by a display device of the computer itself). In another example, alert and/or remediation processing 110 may include preventing access to the sensitive data, for example by encrypting the received new document or otherwise rendering its clear text unreadable and/or by preventing any transmission of the new document pending user approval. Some embodiments may use a combination of alerting and preventing access.

As described above, the overall process 100 may include ML training and/or clustering components (e.g., document representer process 102, sensitive text representer process 104, and clustering process 106) and clear text analysis components (e.g., text identifier process 108). Examples of each of these processes are described with respect to FIGS. 3-6.

Figure 3:
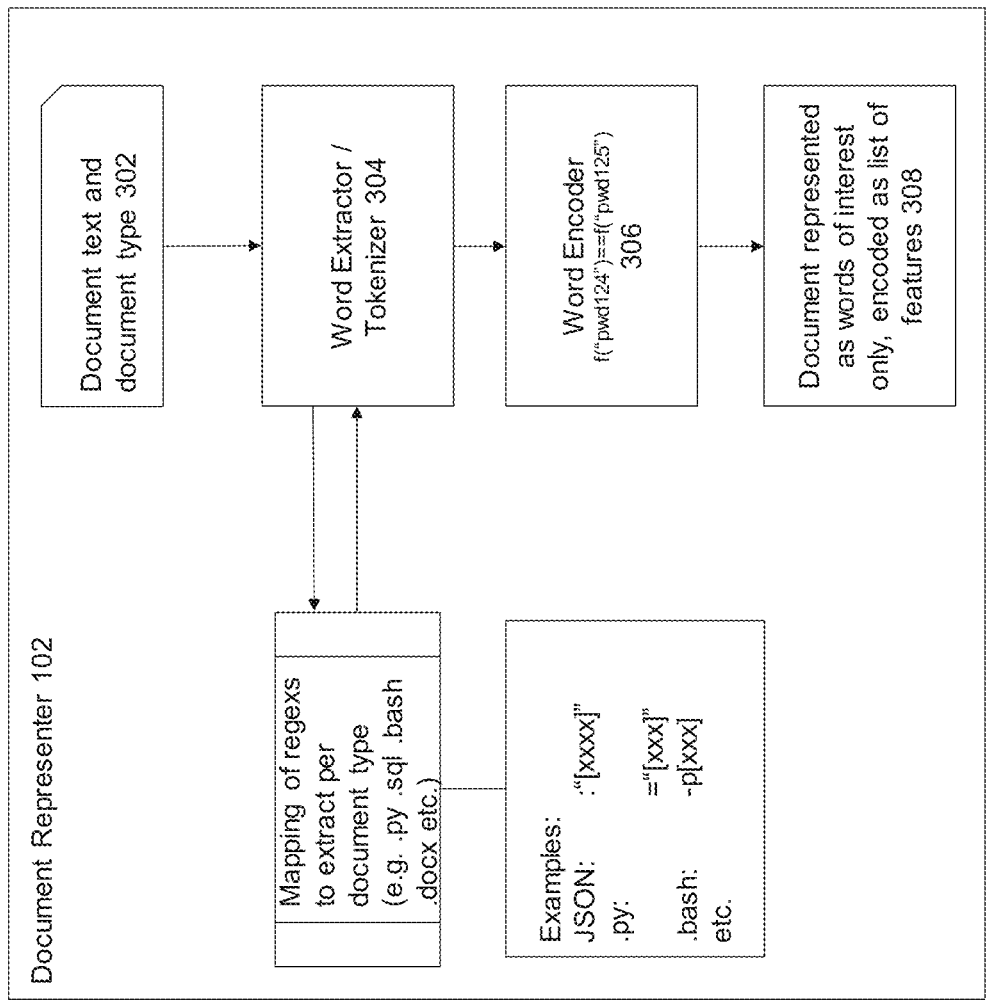
FIG. 3 shows a document representer process according to an embodiment of the disclosure.

FIG. 3 shows a document representer process 102 according to an embodiment of the disclosure. As described above, document representer process 102 may receive, as input, a document or other data set including words, strings, or other sets of text in clear. Document representer process 102 may extract individual words or strings as assigned variables and represent them as Boolean arrays 200 encoding one or more features of the extracted assigned variables. Document representer process 102 may be performed on one or more documents in a benign document corpus 10. In some embodiments, document representer process 102 may receive, as input, an entire benign document corpus 10 for analysis. In some embodiments, document representer process 102 may receive individual documents within a benign document corpus 10 sequentially and, in this case, document representer process 102 may be repeated multiple times for a single benign document corpus 10.

At 302, the computer may receive input. For example, the computer may receive a document including text. The document may be of a specific type. For example, the document may be a .py document, a .sql document, a .bash document, a .docx document, or another type of document. The computer may examine the document to determine its type and/or may receive, as input, data indicating the document type. In some cases, particular document types may have specific predefined variable formats which may be predefined or specified by an admin user, for example. Accordingly, determining the document type may allow subsequent processing to extract assigned variables having the correct specific predefined variable formats for the document type. For example, as shown in FIG. 3, in a JSON script, a variable may be formatted as: "[xxxx]", where "xxxx" is the variable. On the other hand, a .py document including variable "xxx" may format the variable as= "[xxx]", and the same variable in a .bash document may be formatted as –p[xxx]. It may be appreciated that other document types may have other formatting schemes beyond the examples illustrated here.

At 304, the computer may apply a word extractor/tokenizer to the document. This may be regarded as a filtering step whereby the computer extracts only the elements of the document that are in a predefined variable format for that document. For example, the computer may set one or more variable formats corresponding to the document type as determined at 302 and extract assigned variables having the one or more variable formats for processing at 306 as described below. Accordingly, the computer may extract only variables (e.g., rather than commands or other types of words or strings), because sensitive data such as passwords may be present in the form of variables (e.g., as entered by users for variable values), rather than as commands native to a programming language or other standard components of a document. In some embodiments, the word extractor/tokenizer processing at 304 may be omitted, and every word in the document may be extracted as an assigned variable for processing as described below at 306.

The presence or absence the word extractor/tokenizer may respectively provide different processing characteristics in some embodiments. For example, including the word extractor/tokenizer processing may reduce the amount of data that is processed at 306 and/or may reduce the appearance of false positives in 306 due to non-variable text that coincidentally has similar features as sensitive data. On the other hand, omitting the word extractor/tokenizer processing may provide a more robust set of data for processing at 306. Accordingly, word extractor/tokenizer processing may be included or omitted depending on which of these characteristics may be more desirable to the implementer.

At 306, the computer may apply a word encoder to the extracted assigned variables obtained at 304. This may be a form of NLP that may allow similarities among different portions of clear text to be identified. For example, the computer may generate a Boolean array 200 for each extracted assigned variable, such as the Boolean array 200 shown in FIG. 2 and described above, or a Boolean array 200 indicating different features of interest. Features of interest may be features that are characteristic of passwords or other types of sensitive data, but may be less frequently observed in benign data (e.g., embedded capital letters in a word, embedded numbers in a word, special or non-ascii characters in a word, etc.). In some embodiments, the computer may perform a regex search for each feature of interest to determine a Boolean value for the feature. Pseudocode for regex searches may be as follows for the following example features of interest:

Feature: capital letter in the middle
    for character from second character to second last character:
        if character is capital:
            boolean array[index=1]=True
Feature: length of sequence Boolean
    if length(text) greater than 6:
        boolean array[index=2]=True
Feature: contains non-ascii character
    for character in text:
        if character is non-ascii:
            boolean array[index=3]=True At 308, the computer may return a Boolean array 200 for each extracted assigned variable from the data set input at 302. Continuing the pseudocode example, the computer may perform each regex search and may return a Boolean array 200 of length 3 with the first digit indicating whether there is a capital letter in the middle of the extracted assigned variable, the second digit indicating whether the length of the extracted assigned variable is greater than 6, and the third digit indicating whether the extracted assigned variable includes a non-ascii character. Thus, for extracted assigned variable "abcDefg," the Boolean array 200 may be 110, and for extracted assigned variable "Xij," the Boolean array 200 may be 001. As described in greater detail below with respect to FIG. 5, the output Boolean arrays 200 from document representer process 102 may be used as an encoded benign corpus data set 504 for building a model that may be used to identify sensitive content in clear text.

Figure 4:
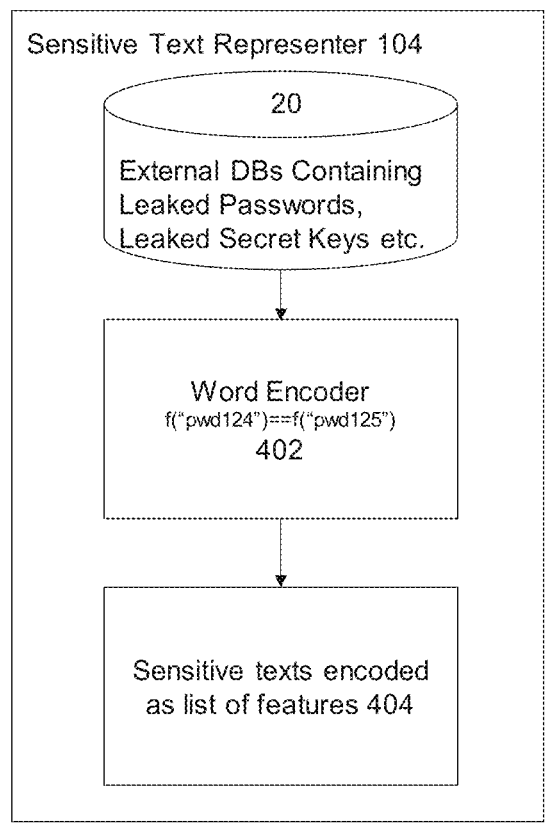
FIG. 4 shows a sensitive text representer process according to an embodiment of the disclosure.

FIG. 4 shows a sensitive text representer process 104 according to an embodiment of the disclosure. As described above, sensitive text representer process 104 may receive, as input, a set of known sensitive data in clear (e.g., a sensitive text corpus 20). For example, sensitive text corpus 20 may be a list of leaked passwords or secret keys. Each text element in the list may be a known example of sensitive data. Thus, unlike in document representer process 102 as described above, sensitive text representer process 104 may process each text element in the list, rather than extracting particular assigned variables. Sensitive text representer process 104 may represent individual sensitive text examples as Boolean arrays 200 encoding one or more features of the examples.

At 402, the computer may apply a word encoder to the text elements in the list. For example, the computer may generate a Boolean array 200 for each text element, such as the Boolean array 200 shown in FIG. 2 and described above, or a Boolean array 200 indicating different features of interest. The Boolean array(s) 200 may be generated similarly to the process of FIG. 3, such as by performing a regex search for each feature of interest to determine a Boolean value for the feature as described above.

At 404, the computer may return a Boolean array 200 for each text element from sensitive text corpus 20. As described in greater detail below with respect to FIG. 5, the output Boolean arrays 200 from sensitive text representer process 104 may be used as an encoded sensitive corpus data set 502 for building a model that may be used to identify sensitive content in clear text.

Figure 5:
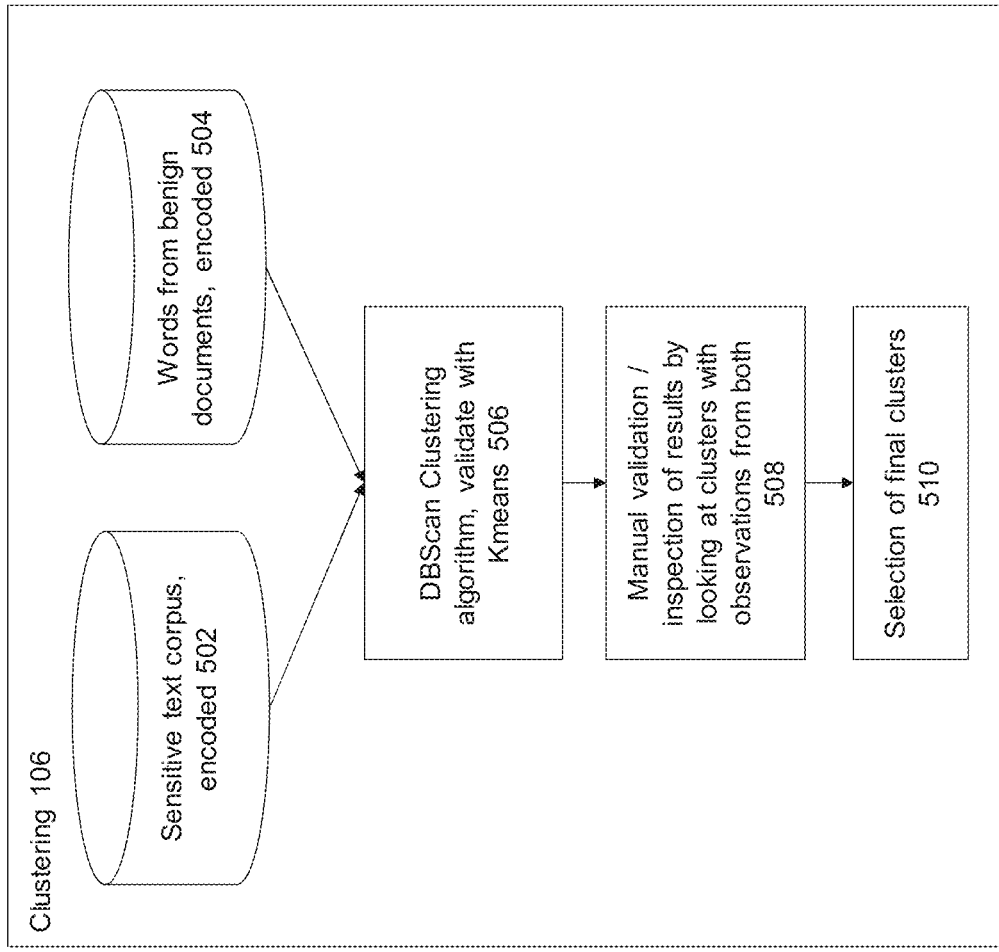
FIG. 5 shows a clustering process according to an embodiment of the disclosure.

FIG. 5 shows a clustering process 106 according to an embodiment of the disclosure. Clustering process 106 may take, as inputs, a sensitive corpus 502 and benign corpus 504 and use these inputs to build clusters of Boolean arrays 200. Sensitive corpus 502 may include Boolean arrays 200 that may be known to describe sensitive data (e.g., as developed by sensitive text representer process 104), and benign corpus 504 may include Boolean arrays 200 that may be known to describe benign data (e.g., as developed by document representer process 102). Accordingly, clustering process 106 may produce a model with at least one cluster of Boolean arrays 200 generated from sensitive data and at least one other cluster of Boolean arrays 200 generated from benign data.

At 506, the computer may run one or more clustering algorithms that may take sensitive corpus 502 and benign corpus 504 as inputs and output at least one cluster of Boolean arrays 200 generated from sensitive data and at least one other cluster of Boolean arrays 200 generated from benign data. For example, the computer may use a DBScan clustering algorithm or other unsupervised algorithm that does not require a specified number of clusters and/or does not require any specified cluster members (e.g., mean-shift clustering, expectation-maximization clustering using Gaussian mixture models, and/or other unsupervised algorithms). An unsupervised clustering algorithm may be used because there is some level of understanding about the data being input (e.g., some is known to be benign, and some is known to be sensitive), but less understanding about how the data may be similar or different. In some embodiments, the clusters generated by DBScan or another algorithm may be verified by a second clustering algorithm. For example, once a number of clusters are generated by DBScan, a second algorithm that requires specifying a number of clusters, such as K-means clustering or other algorithms, may be used to check the initially generated clusters. The second algorithm may be a supervised algorithm, and may be started with a command to produce the same number of clusters as were produced by the first, unsupervised algorithm. For example, if the first DBScan algorithm finds two distinct clusters, a K-means clustering process with an input of two clusters and the same sensitive corpus 502 and benign corpus 504 data as used by the DBScan algorithm may be run.

Boolean arrays 200 clustered in the benign cluster may have features that may be typical of non-sensitive data. There may be patterns and/or tendencies to which users adhere when creating passwords, and the non-sensitive data may not correspond to these patterns and/or tendencies. For example, the benign cluster may include Boolean arrays 200 generated from human-readable words and/or common words with high frequencies or variations of those high frequencies. On the other hand, Boolean arrays 200 clustered in the sensitive cluster may have features that correspond to the patterns and/or tendencies suggestive of sensitive data. For example, the sensitive cluster may include Boolean arrays 200 formed from nonsensical strings that may resemble the representation of some sort of password.

At 508, the computer may present the results of the clustering performed at 506 to a user, for example through a user interface, as a printout, or by some other display technique, in some embodiments. The user may be able to check whether the clusters make sense (e.g., whether benign features are in the benign cluster(s) and sensitive features are in the sensitive cluster(s)) or not (e.g., whether some features that should indicate benign are in the sensitive cluster(s) and/or some features that should indicate sensitive are in the benign cluster(s), indicating too many false positives or negatives). The computer may receive user verification of the clusters if they make sense, or the computer may receive user rejection of the clusters if they do not. In the latter case, the computer may perform clustering 506 again, with the same input data or different input data, and the same algorithm(s) or different algorithm(s), to try to generate a better cluster set and then repeat the processing at 508. In some embodiments wherein more than one benign cluster and/or more than one sensitive cluster are generated, only those clusters with high accuracy (e.g., less than a threshold percentage of false positives or false negatives) may be selected for inclusion in the model, and less accurate clusters above the threshold percentage of false data may be discarded for inclusion in the model.

At 510, the computer may output a selection of final clusters as a model for identifying sensitive information in clear text. For example, the user-approved clusters may form the selection of final clusters if user verification is performed at 506. Otherwise, the output of the clustering algorithm at 504 may be taken as the final clusters if no user verification is performed. In either case, the computer may output at least two clusters. At least one cluster may include Boolean arrays 200 generated from sensitive data, and at least one other cluster may include Boolean arrays 200 generated from benign data. Accordingly, as described below with respect to FIG. 6 for example, a document may be flagged as possibly including sensitive data when one or more words or variables in the document is closely aligned with the sensitive cluster(s) and/or may be flagged as likely benign (or not flagged) when all tested words or variables in the document are closely aligned with the benign cluster(s) only.

Once a model is created by the processing of document representer process 102, sensitive text representer process 104, and clustering process 106, it may be used to analyze documents as described below. Additionally, the model may be occasionally or periodically retrained. For example, data may be added to benign document corpus 10, or a new benign document corpus 10 may be selected. This may necessitate a repeat of document representer process 102 using the new or changed benign document corpus 10.

Alternatively, or additionally, data may be added to sensitive text corpus 20, or a new sensitive text corpus 20 may be selected. This may necessitate a repeat of sensitive text representer process 104 using the new or changed sensitive text corpus 20. If document representer process 102 and/or sensitive text representer process 104 are repeated using different inputs, they may generate different outputs (e.g., different sensitive text corpus 502 and/or different benign text corpus 504) which may be used to repeat clustering process 106 and thereby generate a potentially different model.

Figure 6:
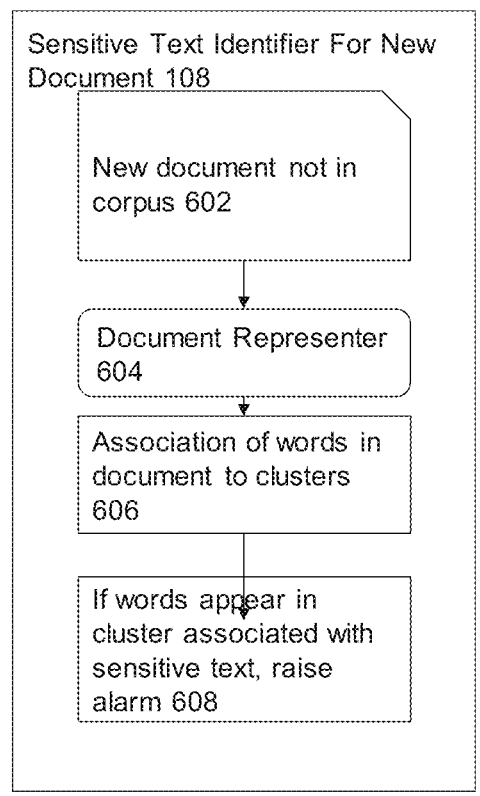
FIG. 6 shows a text identifier process according to an embodiment of the disclosure.

FIG. 6 shows a text identifier process 108 according to an embodiment of the disclosure. Once a model is available (e.g., as generated by clustering process 106), the computer may be able to analyze documents against the model to determine whether they may be likely to contain sensitive data in clear text or not.

At 602, the computer may receive a document or other data set to be tested. In some cases, at least a portion of the document may include clear text. In some cases, the computer may determine whether the document is included in the benign document corpus 10 or sensitive text corpus 20. If so, the computer may alert a user and/or may only automatically process documents not included in the benign document corpus 10 or sensitive text corpus 20. In other cases, the computer may process any input document containing clear text.

At 604, the computer may perform document representer process 102 on the input document. For example, the computer may perform document representer process 102 as described above with respect to FIG. 3, taking the document text and/or document type as inputs at 302 and outputting one or more Boolean arrays 200 at 308. The output Boolean arrays 200 may represent the features of the extracted assigned variables from the document.

At 606, the computer may determine an association of the Boolean arrays 200 generated at 604 with the clusters in the model. For example, the computer may process the Boolean arrays 200 generated at 604 against the model using the same clustering algorithm used to create the model. Accordingly, the same algorithm may cluster the Boolean arrays 200 generated at 604 with their nearest cluster(s) in the model. If all Boolean arrays 200 generated at 604 are grouped with benign cluster(s) in the model, the computer may determine there is not likely to be sensitive data in clear text. If at least one of the Boolean arrays 200 generated at 604 is grouped with at least one sensitive cluster in the model, the computer may determine there may potentially be sensitive data in clear text.

At 608, the computer may respond to the determination made at 606. For example, if one or more of the Boolean arrays 200 generated at 604 is grouped with a sensitive cluster in the model, the computer may flag the one or more Boolean arrays 200 as potentially containing sensitive data and/or may take remedial action. The remedial action may include alerting a user that the input document may include sensitive data. In some embodiments, the alert may be presented through a user interface, for example. In some embodiments, the alert may specify the specific word(s) associated with the specific Boolean array(s) 200 that were grouped with the sensitive cluster. In some embodiments, the computer may be configured to automatically redact the specific word(s) associated with the specific Boolean array(s) 200 that were grouped with the sensitive cluster, prevent transmission or viewing of the document until the specific word(s) are removed or obscured, and/or perform other remedial actions.

Figure 7:
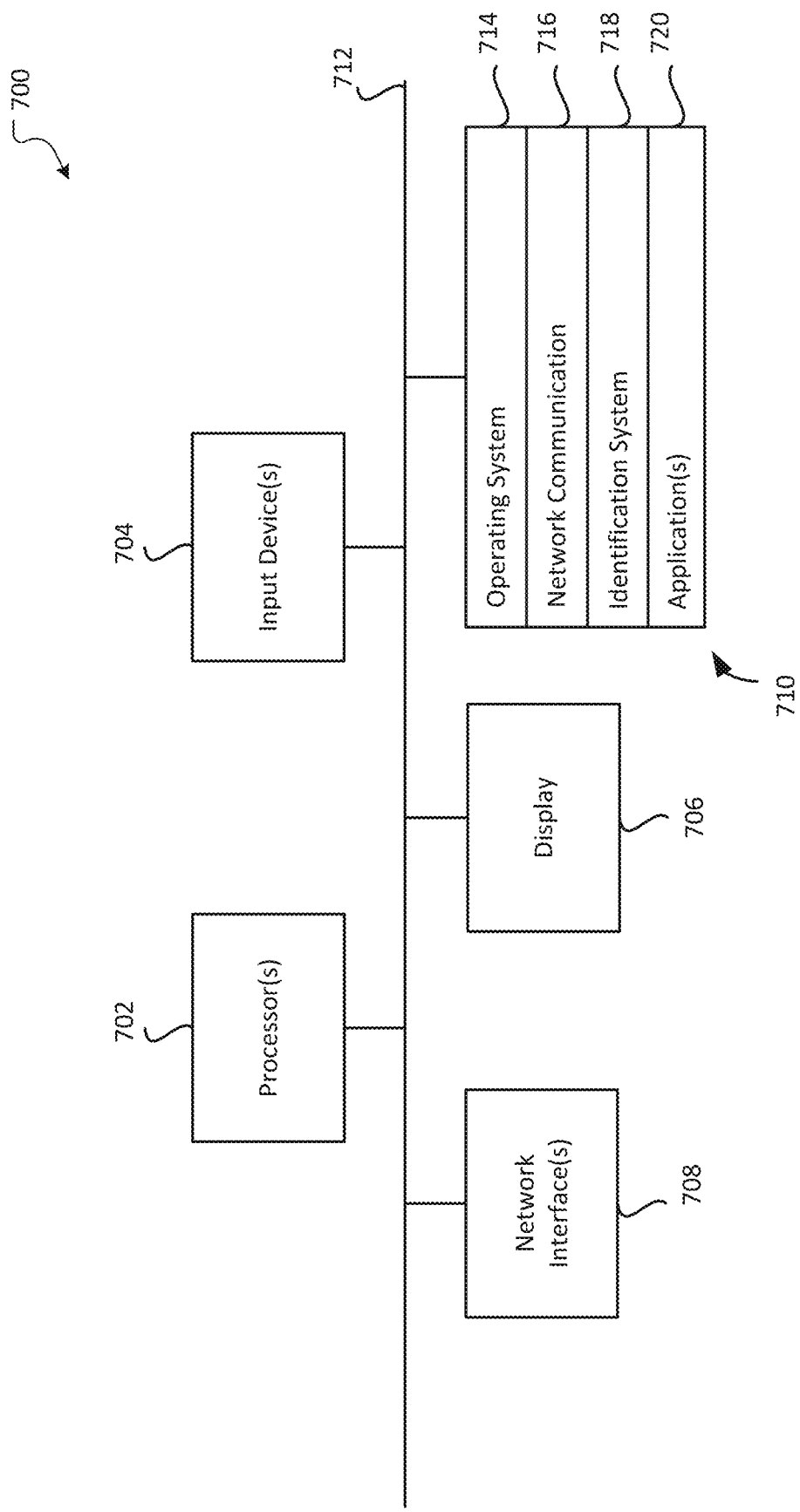
FIG. 7 shows a computing device according to an embodiment of the disclosure.

FIG. 7 shows a computing device 700 according to an embodiment of the disclosure. For example, computing device 700 may perform the functions related to automatic detection of specific data such as sensitive information in clear text described above. The computing device 700 may be implemented on any electronic device that runs software applications derived from compiled instructions, including without limitation personal computers, servers, smart phones, media players, electronic tablets, game consoles, email devices, etc. In some implementations, the computing device 700 may include one or more processors 702, one or more input devices 704, one or more display devices 706, one or more network interfaces 708, and one or more computer-readable mediums 710. Each of these components may be coupled by bus 712, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 712 may be any known internal or external bus technology, including but not limited to ISA, EISA, PCI, PCI Express, NuBus, USB, Serial ATA or FireWire. Computer-readable medium 710 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 may include various instructions for implementing an operating system 714 (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 may establish and maintain network connections (e.g., software for implementing communication protocols, such as TCP/IP, HTTP, Ethernet, telephony, etc.).

Identification system instructions 718 may include instructions for performing the functions related to automatic detection of specific data such as sensitive information in clear text described above, for example one or more portions of the processes illustrated in FIGS. 1 and/or 3-6.

Application(s) 720 may be an application that uses or implements the processes described herein and/or other processes. The processes may also be implemented in operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of identifying sensitive data in clear text comprising:
   receiving, at a processor, clear text data;
   representing, by the processor, at least a portion of the clear text data as at least one array encoding a description of at least one feature of the clear text data;
   processing, by the processor, the at least one array using a clustering algorithm to determine whether the at least one array is grouped with a benign cluster or a sensitive cluster of a model, wherein processing the at least one array further includes receiving the at least one array as input and setting a corresponding Boolean value to at least one feature included in the at least one array, and wherein the at least one feature includes characteristics known to be associated with the sensitive cluster; and
   in response to determining that the at least one array is grouped with the sensitive cluster, generating, by the processor, an alert indicating that the clear text data includes sensitive information.

2. The method of claim 1, wherein the representing includes:
   performing at least one regular expression search configured to find the at least one feature; and
   setting at least one Boolean value corresponding to the at least one feature based on the results of the at least one regular expression search.

3. The method of claim 2, wherein:
   the at least one Boolean value is set to 1 in response to the at least one regular expression search finding the at least one feature; and the at least one Boolean value is set to 0 in response to the at least one regular expression search failing to find the at least one feature.

4. The method of claim 1, further comprising building, by the processor, the model, wherein building the model comprises:
representing at least a portion of benign corpus data as at least one benign array encoding a description of at least one feature of the benign corpus data;
representing at least a portion of sensitive corpus data as at least one sensitive array encoding a description of at least one feature of the sensitive corpus data; and
processing the at least one benign array and the at least one sensitive array using the clustering algorithm to generate the benign cluster and the sensitive cluster.

5. The method of claim 4, wherein building the model further comprises processing the at least one benign array and the at least one sensitive array using a second clustering algorithm to verify the benign cluster and the sensitive cluster.

6. The method of claim 1, wherein the clustering algorithm is an unsupervised algorithm.

7. The method of claim 1, wherein the at least one feature includes at least one feature characteristic of a password.

8. A system for identifying sensitive data in clear text comprising:
a device configured to present a user interface; and
a processor configured to:
receive clear text data;
represent at least a portion of the clear text data as at least one array encoding a description of at least one feature of the clear text data;
process the at least one array using a clustering algorithm to determine whether the at least one array is grouped with a benign cluster or a sensitive cluster of a model, wherein processing the at least one array further includes receiving the at least one array as input and setting a corresponding Boolean value to at least one feature included in the at least one array, and wherein the at least one feature includes characteristics known to be associated with the sensitive cluster;
in response to determining that the at least one array is grouped with the sensitive cluster, generating, by the processor, an alert indicating that the clear text data includes sensitive information; and
cause the device to present the alert.

9. The system of claim 8, wherein the processor is configured to represent the at least the portion of the clear text data as the at least one array by a process including:
performing at least one regular expression search configured to find the at least one feature; and
setting at least one Boolean value corresponding to the at least one feature based on the results of the at least one regular expression search.

10. The system of claim 9, wherein:
the at least one Boolean value is set to 1 in response to the at least one regular expression search finding the at least one feature; and
the at least one Boolean value is set to 0 in response to the at least one regular expression search failing to find the at least one feature.

11. The system of claim 8, wherein the processor is configured to build the model by a process comprising:
representing at least a portion of benign corpus data as at least one benign array encoding a description of at least one feature of the benign corpus data;
representing at least a portion of sensitive corpus data as at least one sensitive array encoding a description of at least one feature of the sensitive corpus data; and
processing the at least one benign array and the at least one sensitive array using the clustering algorithm to generate the benign cluster and the sensitive cluster.

12. The system of claim 11, wherein the process further comprises processing the at least one benign array and the at least one sensitive array using a second clustering algorithm to verify the benign cluster and the sensitive cluster.

13. The system of claim 8, wherein the clustering algorithm is an unsupervised algorithm.

14. The system of claim 8, wherein the at least one feature includes at least one feature characteristic of a password.

* * * * *